(12) United States Patent
Stothers et al.

(10) Patent No.: US 7,665,708 B2
(45) Date of Patent: Feb. 23, 2010

(54) VIBRATION ISOLATION MOUNT AND METHOD

(75) Inventors: Ian Stothers, Norfolk (GB); Ivan Scon, Cambridgeshire (GB)

(73) Assignee: Ultra Electronics Limited, Greenford, Middlesex (GB)

( * ) Notice: Subject to any disclaimer, the term of this patent is extended or adjusted under 35 U.S.C. 154(b) by 481 days.

(21) Appl. No.: 11/348,508

(22) Filed: Feb. 6, 2006

(65) Prior Publication Data

US 2007/0001354 A1 Jan. 4, 2007

Related U.S. Application Data

(63) Continuation of application No. PCT/GB2004/003220, filed on Jul. 26, 2004.

(30) Foreign Application Priority Data

Aug. 8, 2003 (GB) ................................. 0318690.5

(51) Int. Cl.
*F16M 13/00* (2006.01)
(52) U.S. Cl. ........................ 248/638; 267/136
(58) Field of Classification Search ................. 248/638, 248/550, 624, 602; 74/5.5; 188/379; 267/136
See application file for complete search history.

(56) References Cited

U.S. PATENT DOCUMENTS 3,490,556 A 1/1970 Bennett, Jr. et al.
3,808,983 A 5/1974 Pielkenrood (Continued)

FOREIGN PATENT DOCUMENTS

DE 1999 30 725 C1 1/2001

(Continued)

*Primary Examiner*—Korie Chan
(74) *Attorney, Agent, or Firm*—Dickstein Shapiro LLP

(57) ABSTRACT

The present invention provides an apparatus and method for vibration isolation. The invention may be conceptualized as a vibration isolation mount. The vibration isolation mount mounts a first member to a second member for reducing the transmission of vibrations from the first member to the second member. The vibration isolation mount comprises a first mounting means for mounting to the first member, and a second mounting means for mounting to the second member. A spring means is arranged between the first and second mounting means, wherein said spring means is coupled to the first mounting means and provides a spring force between said first and second mounting means. The invention may also be conceptualized as a vibration isolation method. The method controls vibrations transmitted from a first member to a second member when the second member is mounted on the first member using a spring arrangement. The spring arrangement provides a delay in transmission of an impulse between the first and second members. The method comprising the steps of (1) sensing vibrations in a first member; (2) applying a force on a second member in response to the sensed vibrations to reduce vibrations in the second member; and (3) wherein the spring arrangement provides a delay equal to or greater than a delay in the provision of said force in response to the vibrations in said first member.

86 Claims, 10 Drawing Sheets

U.S. PATENT DOCUMENTS

| | | |
|---|---|---|
| 4,531,699 A | 7/1985 | Pinson |
| 5,000,415 A | 3/1991 | Sandercock |
| 5,117,136 A * | 5/1992 | Kobayashi et al. ............ 310/12 |
| 5,582,385 A * | 12/1996 | Boyle et al. ................. 248/550 |
| 5,713,438 A | 2/1998 | Rossetti et al. |
| 5,792,948 A | 8/1998 | Aoki et al. |
| 5,879,237 A | 3/1999 | Ishihara |
| 6,378,672 B1 * | 4/2002 | Wakui ....................... 188/378 |
| 2006/0225977 A1 * | 10/2006 | Melz et al. ............... 188/266.7 |

FOREIGN PATENT DOCUMENTS

| | | |
|---|---|---|
| EP | 0 621 418 A2 | 10/1994 |
| GB | 2 080 919 A | 2/1982 |
| GB | 2 228 778 A | 9/1990 |
| WO | WO 92/01876 | 2/1992 |
| WO | WO 94/18616 | 8/1994 |
| WO | WO 00/49309 | 8/2000 |
| WO | WO 02/23062 A1 | 3/2002 |

* cited by examiner

VIBRATION ISOLATION MOUNT AND METHOD

CROSS-REFERENCE TO RELATED APPLICATION

This application is a continuation of International Application PCT/GB2004/003220 with an International Filing Date of Jul. 26, 2004, and claiming priority to co-pending Great Britain Patent Application No. 0318690.5 filed on Aug. 8, 2003, both of which are relied on and incorporated herein by reference.

TECHNICAL FIELD

The present invention generally relates to a vibration isolation mount and a vibration isolation method.

BACKGROUND OF THE INVENTION

Often there is a need to reduce the transmission of vibration between two elements of an engineering structure while still maintaining mechanical support. The ultimate aim can be associated with reducing the effects of vibration and/or noise on both people and equipment.

One such problem is the reduction of broadband cabin noise within civil aircraft. This is conventionally achieved by improving the soundproofing within the cabin (which normally entails a consequent increase in weight), together with the use of simple passive isolators to reduce vibration transmission between the main air frame and the interior trim panels. The latter is important because the vibration path through the trim panel mounts is the dominant one in many cases e.g. for excitation by the external turbulent boundary layer pressure field. The reason for this is that the boundary layer pressure field generally produces subsonic vibrations and thus transmission between the air frame and the trim panel through the air insulation gap is normally small compared to the transmission through the mechanical couplings.

Current practice is to use small blocks of elastomeric material for the isolation. Such isolators reduce vibration transmission above the resonant frequency associated with the isolators' stiffness reacting against the receiving mass: the so-called isolation frequency. The use of an elastomer provides sufficient internal damping so that the classical increase in transmission at the isolation frequency is small.

However, an elastomer does not behave as a classical stiffness isolator because its stiffness increases with increasing frequency. This can produce a much higher transmission than the classical spring at frequencies well above the isolation frequency. Also, elastomers are notoriously temperature sensitive which can compromise the performance.

The problem with replacing the elastomeric material with a member that has a classical spring stiffness behaviour is that high vibration transmission will occur at and around the resonance frequency associated with the isolator's stiffness against the receiving mass. Unfortunately, introducing large amounts of damping into such a spring arrangement such as a metal spring in order to reduce the vibration transmission at or around the resonance frequency is difficult when a long service life is required. Additionally, the use of heavy damping produces unwanted increases in transmission either side of the isolation frequency.

It is therefore an object of the present invention to provide an improved vibration isolation mount and method.

SUMMARY OF THE INVENTION

Embodiments of the present invention provide an apparatus and method for vibration isolation.

Briefly described, in architecture, one embodiment of the system, among others, can be implemented as follows. The vibration isolation mount mounts a first member to a second member for reducing the transmission of vibrations from the first member to the second member. The vibration isolation mount comprises a first mounting means for mounting to the first member, and a second mounting means for mounting to the second member. A spring means is arranged between the first and second mounting means, wherein said spring means is coupled to the first mounting means and provides a spring force between said first and second mounting means.

The invention may also be conceptualized as a vibration isolation method. The method controls vibrations transmitted from a first member to a second member when the second member is mounted on the first member using a spring arrangement. The spring arrangement provides a delay in transmission of an impulse between the first and second members. The method comprising the steps of (1) sensing vibrations in a first member; (2) applying a force on a second member in response to the sensed vibrations to reduce vibrations in the second member; and (3) wherein the spring arrangement provides a delay equal to or greater than a delay in the provision of said force in response to the vibrations in said first member.

These and other embodiments and advantages of the present invention will become apparent to one with skill in the art upon examination of the following drawings and detailed description. It is intended that all such additional apparatuses, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
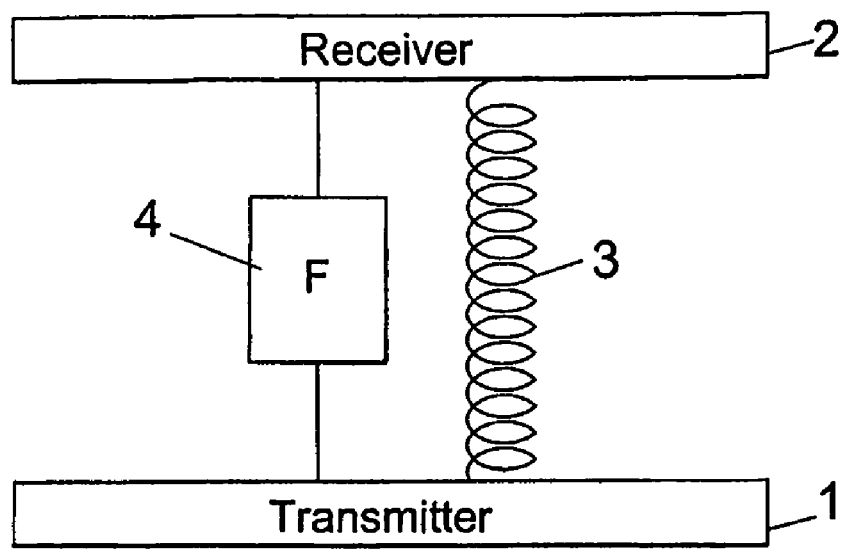
FIG. 1 is a schematic diagram illustrating the principles of a first embodiment of the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

In accordance with a first aspect of the present invention, an active vibration isolation mount is provided for mounting a first member to a second member and for reducing the transmission of vibrations from the first member to the second member. Spring means are arranged to lie between the first and second member when the mount is inserted between the first and second members. Sensing means sense vibration in the first member and force means are provided for applying a controlling force to the second member in dependence upon vibrations sensed by the sensing means in order to reduce vibrations in the second member. The spring means provides a delay between the first and second members which gives advanced warning of the vibration transmitted to the second member. This delay is equal to or greater than a delay incurred in the application of the controlling force by the force means in response to the vibrations in the first member.

Thus in accordance with this aspect of the present invention, the vibrations transmitted from the first member to the second member through the spring means are delayed by an amount which is sufficient to provide for a control signal to be actively generated for the active control of the force means to apply a controlling force in order to reduce vibrations in the second member. The provision of the delay in the impulse response of the spring means provides for the feedforward control of the application of the controlling force to the second member. Thus this aspect of the present invention enables the utilization of the low passive transmission properties at high frequencies provided by the spring means whilst ameliorating the effect of resonance at the lower isolation frequency by using active control.

In one embodiment of the present invention the active vibration mount is provided as a unit having first mounting means for mounting to the first member and second mounting means for mounting to the second member. The spring means is arranged between the first and second mounting means and the force means applies the controlling force to the second mounting means. Also in one embodiment, the sensing means is arranged to sense vibrations in the first mounting means.

The present invention enables the application of the force by the force means and the action of the spring means to be in parallel between the first and second mounting means. Conveniently, the force means and the spring means can be arranged substantially concentrically or axially symmetrically. For example, a single coaxial spring arrangement can be used or multiple spring arrangements arranged symmetrically with one or more force arrangements.

In one embodiment, the spring means preferably has a stiffness in a direction extending between the mounting means but does not vary substantially with the frequency of the vibrations.

In one embodiment, the spring means has a configuration which is selected to provide the required delay. For example, the mass per unit length and/or length of the spring or springs can be selected to provide the required delay.

In the feedforward active control system the required delay in the spring means is required because of the control system delay which is typically incurred by the response of the sensing means, force means and control means.

In one embodiment of the present invention the sensing means, spring means and force means are adapted to provide broadband vibration isolation, i.e. the control system is a broadband control system.

In one embodiment of the present invention, because the mount is required not only to provide vibration isolation, but also stiff mounting of the second member on the first member, the spring means has a high static stiffness. Stiff mounting comprises mounting with sufficient stiffness to support the static loads with an acceptable displacement.

At certain frequencies, the vibrations detected by the sensing means can reduce, for example, as a result of the tuned vibration absorber action of the mass on the spring means. In such conditions the vibrations detected by the sensing means reduce and thus potentially the active control of the application of the controlling force would cause a reduction in the application of such a controlling force. Thus in one embodiment of the present invention an error sensing means is provided for sensing vibrations in the second member. The error sensing means thus provides a feedback signal for control of the application of the controlling force. The force means is responsive to the sensed vibrations in the second member by virtue of a control signal from the control means which responds to the vibrations. Thus in accordance with this embodiment of the present invention, the control system comprises a combined feedforward and feedback control system which prevents loss of the reference signal caused by occurrences such as the tuned vibration absorber action of the mass on the spring.

In the present invention the spring means can comprise any suitable spring member or spring arrangement which can provide required impulse delay between the first and second members. Such a spring arrangement can comprise one or a number of springs such as helical springs or leaf springs. Conveniently, such springs are conventionally made of metal. The present invention is not, however, limited to any particular form of spring arrangement and any arrangement which provides a required delay is encompassed within the scope of the present invention.

In one embodiment of the present invention the force means is mechanically coupled between the first and second members (or the first and second mounting means) to apply the controlling force to the second member. In such an embodiment the force means can comprise an electromagnetic actuator comprising a coil member coupled to the first mounting means or first member and a magnetic member coupled to the second mounting means or second member. In one embodiment the magnetic member is substantially heavier than the coil member and provides a blocking mass connected to the second member or second mounting means. In one embodiment a coil member and magnetic member are coupled by coupling means providing low stiffness in a direction extending between the first and second mounting means and a high stiffness in a perpendicular direction.

In one embodiment of the present invention, a lumped blocking mass additional to or in place of the magnetic member can be provided coupled to the second mounting means or second member.

In another embodiment of the present invention a reactive inertial mass is provided and the force means is connected between the mass and the second mounting means or second member to apply the controlling force to the second mounting means or second member. Thus this embodiment of the present invention provides an inertial force on the second member. The force means can comprise an electromagnetic actuator comprising a coil member and a magnetic member, wherein the coil member or the magnetic member comprises the mass. Preferably the magnetic member comprises the mass and the coil member is coupled to the second mounting means or second member. The coil member and magnetic member can be coupled by coupling means providing low stiffness in a first direction extending between the first and second mounting means or first and second members and high stiffness in a perpendicular direction.

The present invention also provides an active vibration isolation mount arrangement comprising the active vibration mount and control means for generating the control signal in response to the vibrations sensed by the sensing means.

The present invention also provides an active vibration isolation mount arrangement comprising a plurality of the active vibration isolation mounts and control means for generating the control signals for the force means in response to the vibrations sensed by each respective sensing means. Thus, in this aspect of the present invention the active vibration isolation mount arrangement provides for a single central active control of a number of mounts.

One aspect of the present invention also provides a method of controlling vibrations transmitted from a first member to a second member when the second member is mounted on the first member using a spring arrangement providing a delay in transmission of an impulse between the first and second members. Vibrations in the first member are sensed and the force is applied on the second member in response to the sensed vibrations to reduce vibrations in the second member. The spring arrangement provides a delay equal to or greater than a delay in the provision of the force in response to the vibrations in the first member.

Another aspect of the present invention provides a method of isolating a trim panel mounted on an aircraft frame from vibrations in the aircraft frame caused by subsonic boundary layer noise using a trim mount having a spring arrangement providing a delay in transmission of an impulse between the trim panel and the aircraft frame. Vibrations in the aircraft frame are sensed and a force is applied to the trim panel in response to the sensed vibrations to reduce vibrations in the trim panel. The spring arrangement provides a delay equal to or greater than a delay in the provision of the force in response to the vibrations in the aircraft frame.

The present invention also provides a method of designing an active mount arrangement for mounting a first member to a second member comprising selecting a sensor for sensing vibrations in the first member, designing an actuator arrangement for providing a force on the second member, selecting an active force controller for controlling the actuator in response to the sensed vibrations to reduce vibrations in the second member, and designing a spring member for provision between the first and second members to provide a delay in transmission of an impulse between the first and second members equal to or greater than a delay incurred by the sensor, the actuator and the active force controller in the provision of the force in response to the vibrations in the first member.

The present invention further provides a method of controlling vibrations transmitted from the first member to a second member when the second member is mounted on the first member. A sensor is provided sensing vibrations in the first member. An actuator arrangement is provided applying a force on the second member. An active force controller is provided to control the actuator in response to the sensed vibrations to reduce vibrations in the second member. The second member is mounted on the first member using a spring member providing a delay in transmission of an impulse between the first and second members equal to or greater than a delay in the provision of the force by the active force controller in response to the vibrations in the first member.

The present invention also provides an active mount arrangement for mounting a first member to a second member and for reducing the transmissions of vibrations from the first member to the second member. The mount comprises a spring arrangement between the first and second members having a stiffness in a first direction extending between the first and second members that does not vary substantially with frequency of the vibrations, a sensor arrangement for sensing vibrations in the first member, a force actuator for applying a controlling force to the second member, and a controller connected to the sensor for controlling the application of the force by the force actuator in response to the vibrations sensed by the sensor. A spring arrangement provides a delay equal to or greater than a delay in the application of the controlling force by the force actuator in response to the sensed vibrations.

A further aspect of the present invention provides an active vibration isolation mount for mounting a first member to a second member and for reducing the transmission of vibrations from the first member to the second member. The mount arrangement comprises a first mounting point for mounting to the first member, a second mounting point for mounting to the second member, a spring arrangement connected between the first and second mounting points, a sensor arrangement for sensing vibrations in the first member, and a force actuator arrangement for applying a controlling force to the second member and for the setting of parameters in a controller in response to the vibrations sensed by the sensor arrangement. The spring arrangement is adapted to provide a delay in the first direction equal to or greater than a delay in the application of the controlling force in response to the vibrations in the first member.

Another aspect of the present invention provides an active vibration isolation mount for mounting a first member to a second member and for reducing the transmission of vibrations from said first member to said second member, the active vibration isolation mount comprising a first mounting arrangement for mounting to said first member; a second mounting arrangement for mounting to said second member; a spring arrangement coupled between said first and second mounting arrangements; a substantially cylindrical coil frame extending axially between said first and second mounting arrangements and couple at one end thereof to said first or second mounting arrangements; a coil arrangement mounted coaxially on the coil frame; a magnetic circuit body for providing a magnetic flux path circuit from a radially inner position adjacent to said coil to a radially outer position adjacent to said coil such that said coil lies in the flux path, and forming an annular cavity between said magnetic circuit body and said coil frame; and a radial suspension arrangement extending radially between said coil frame and said magnetic circuit body in said cavity for providing radially stiff support and axial compliance.

Thus this aspect of the present invention provides a mount arrangement which provides for the efficient lateral support of the coil within the magnetic flux air gap while allowing for relative axial movement. The design is space efficient because of the provision of the lateral support close to the coil within the magnetic circuit in a region formed by the magnetic circuit.

In one embodiment the coil frame is coupled at one end thereof to the first or second mounting arrangements and the magnetic circuit body is coupled to the second or first mounting arrangements respectively. Thus in this arrangement the electromagnetic force can be applied directly between the first and second mounting arrangements substantially coaxially with the spring force.

In another embodiment the coil frame is coupled at one end thereof to the second mounting arrangements and the magnetic circuit body is free to move axially. Thus in this embodiment the mass of the magnetic circuit body acts as an inertial mass and the electromagnetic actuator provides a force between the inertial mass and the second mounting arrangement.

Another aspect of the present invention provides a vibration isolation mount for mounting a first member to a second member and for reducing the transmission of vibrations from said first member to said second member, the vibration isolation mount comprising first mounting means for mounting to said first member; second mounting means for mounting to said second member; spring means arranged between said first and second mounting means; and a mass coupled to said spring means so as to lie in or adjacent to a region between said spring means and said second mounting means; wherein said spring means is coupled to said first mounting means and provides a spring force between said first and second mounting means.

In this aspect of the present invention, the provision of the blocking mass as a lumped mass at the end of the spring arrangement at the point of coupling the vibration isolation mount to the second member provides an optimised passive mount. It is particularly suited for use with second members that have a distributed mass e.g. a trim panel, that is thin at the point that vibration isolation mounting is required.

Another aspect of the present invention provides a vibration absorber for reducing the vibrations in a member, the vibration absorber comprising mounting means for mounting to said member; an inertial mass; spring means coupled to said inertial mass and for providing a spring force between said inertial mass and said mounting means; and a blocking mass coupled to said spring means so as to lie in or adjacent to a region between said spring means and said mounting means.

In this aspect of the present invention, the provision of the blocking mass as a lumped mass at the end of the spring arrangement at the point of coupling the vibration absorber to the member provides an optimised passive absorber. It is particularly suited for use with members that have a distributed mass e.g. are thin at the point that vibration absorption is required.

Having summarized the invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now in detail to the drawings in which the reference numerals indicate like parts throughout several views.

FIG. 1 illustrates the principles of a first embodiment of the present invention. Vibrations in a transmitter 1 are transmitted to a receiver 2 via a spring coupling 3. The spring coupling 3 provides for the mounting of the receiver 2 on the transmitter 1 and provides for a stiff static mount. A force actuation arrangement 4 is provided coupled between the transmitter 1 and the receiver 2 in parallel with the spring arrangement 3. Thus in accordance with the principles of this embodiment of the present invention, the vibrations transmitted from the transmitter 1 to the receiver 2 via the spring arrangement 3 are actively controlled by the application of a force to the receiver 2 by the force actuation arrangement 4.

Figure 2:
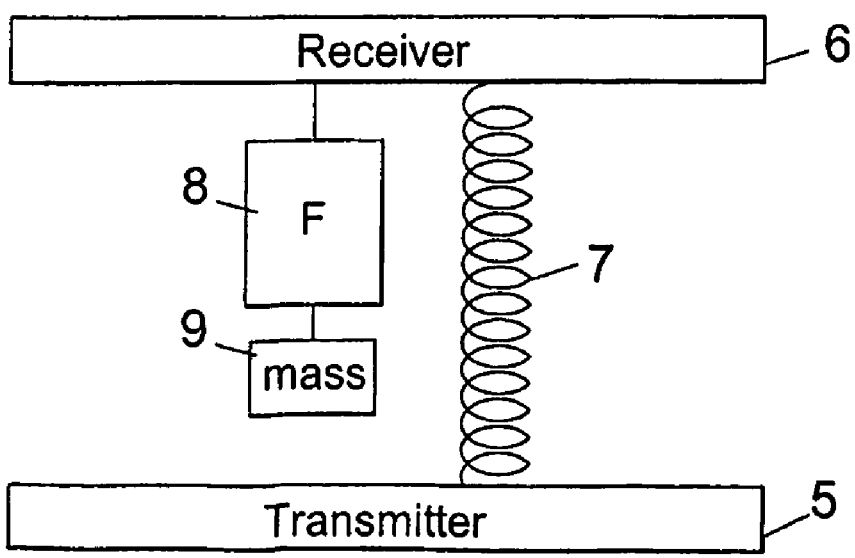
FIG. 2 is a schematic diagram illustrating the principles of a second embodiment of the present invention.

FIG. 2 illustrates the principles of a second embodiment of the present invention. Vibrations in a transmitter 5 are transmitted to a receiver 6 via a spring arrangement 7. The receiver 6 is statically mounted on the transmitter 5 via the spring arrangement 7. A force actuation arrangement 8 is provided coupled to the receiver 6. A mass 9 is provided coupled to the force actuation arrangement 8. Thus in this way a controlling force is applied to the receiver 6 by the force actuation arrangement 8. In this embodiment the force applied is an inertial force. This embodiment of the present invention has the benefit of avoiding a direct connection between the receiver 6 and transmitter 5 through the force actuation arrangement. This, unlike the embodiment of FIG. 1, does not provide a secondary vibration path. However, this embodiment relies on an inertial force.

Figure 3:
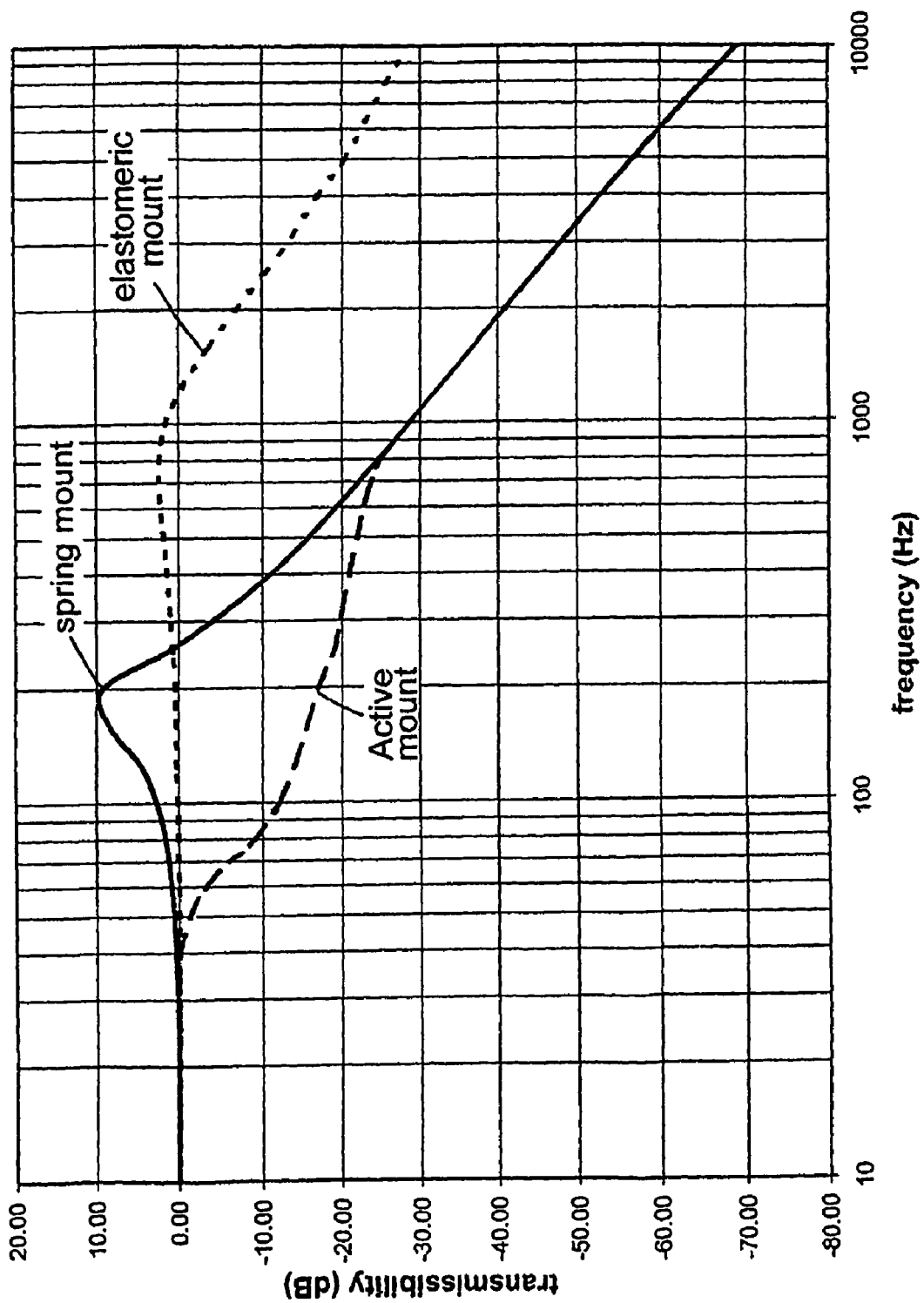
FIG. 3 illustrates graphs of the transmission provided by a conventional elastomeric mount, a spring mount, and an active mount, all three with the same static stiffness, in accordance with an embodiment of the present invention.

FIG. 3 is a graph illustrating the transmission response with frequency of a conventional elastomeric mount, a spring mount, and an active mount, all three with the same static stiffness in accordance with an embodiment of the present invention. The elastomeric mount however suffers from a frequency dependant stiffness which causes high transmission in the mid and high frequency regions.

The requirement of a vibration isolation mount is to provide high stiffness to static loads and at frequencies above a few Hertz to reduce the transmission capabilities of the mount to provide for vibration isolation. As can be seen in FIG. 3, a conventional elastomeric mount provides for some vibration isolation at high frequencies. The elastomeric mount however suffers from resonance at low frequencies and at these frequencies the transmission is high. A spring mount provides for an improved isolation at high frequencies. However, a spring mount suffers from strong resonance at low frequencies which, in the example shown in FIG. 3, peaks at 200 Hz. Resonance occurs when the isolators' stiffness reacts against the receiving mass. The resonant frequency $F_R$ is given by:

$$F_R = \frac{1}{2\pi}\sqrt{\frac{K}{m}}$$

where K is the spring constant and m is the mass on the spring.

Thus, the resonant frequency can be shifted to lower frequencies and an improved high frequency isolation can be achieved by increasing the mass, i.e. the blocking mass. However, for certain applications, such as in aircraft, there is a limited ability to increase the mass in the mount. Further, even by increasing the mass, the resonant frequency merely moves to lower frequencies but is still present.

Embodiments of the present invention aim to actively control the vibrations at the low frequency region in order to provide or improve isolation at low frequencies and to ameliorate the effects of resonance in a spring-type mount. The effect of the removal of the resonance effect in an active mount in accordance with an embodiment of the present invention is illustrated in FIG. 3. In order to achieve this, as illustrated in FIGS. 1 and 2, the active force controller operates in parallel with the spring arrangement.

Figure 4:
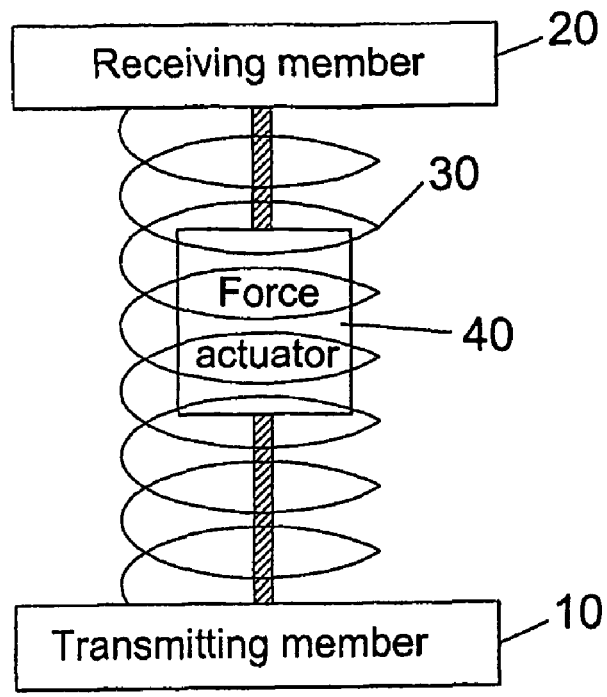
FIG. 4 is a schematic diagram of one embodiment of the present invention in accordance with the principles of the embodiment of FIG. 1.

The present invention encompasses any convenient manner of providing for the parallel operation of the force actuator and the spring arrangement. For example, FIG. 4 illustrates an embodiment of the present invention in accordance with the principles of the embodiment of FIG. 1 in which a transmitting member 10 is mounted to a receiving member 20 by a mount arrangement comprising a spring arrangement 30 illustrated as a helical spring in this embodiment, arranged concentrically around a force actuator 40 connected between the transmitting 10 and the receiving member 20.

Figure 5:
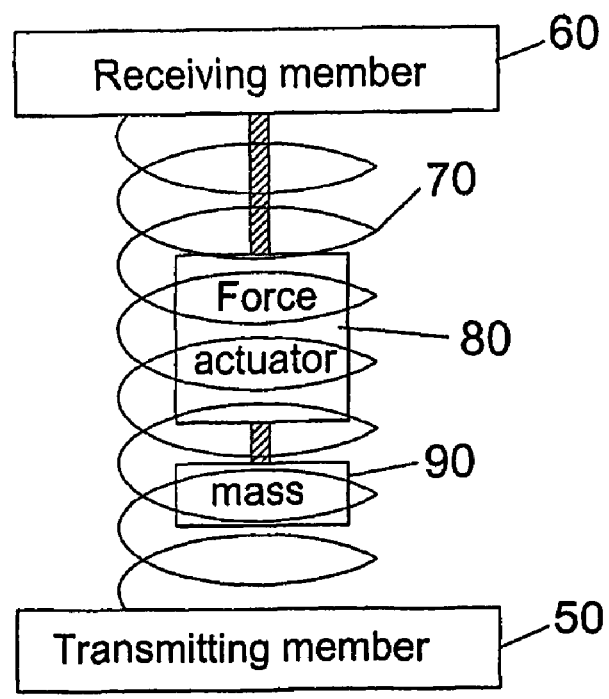
FIG. 5 is a schematic diagram of an embodiment of the present invention in accordance with the principles of the embodiment of FIG. 2.

FIG. 5 illustrates another embodiment of the present invention in accordance with the principles of the embodiment of FIG. 2 in which a transmitting member 50 is mounted to a receiving member 60 by a mount arrangement comprising a spring arrangement 70 arranged concentrically around a force actuator 80 which is coupled between the receiving member 60 and a mass 90 which is also arranged concentrically within the spring arrangement 70.

Figure 6:
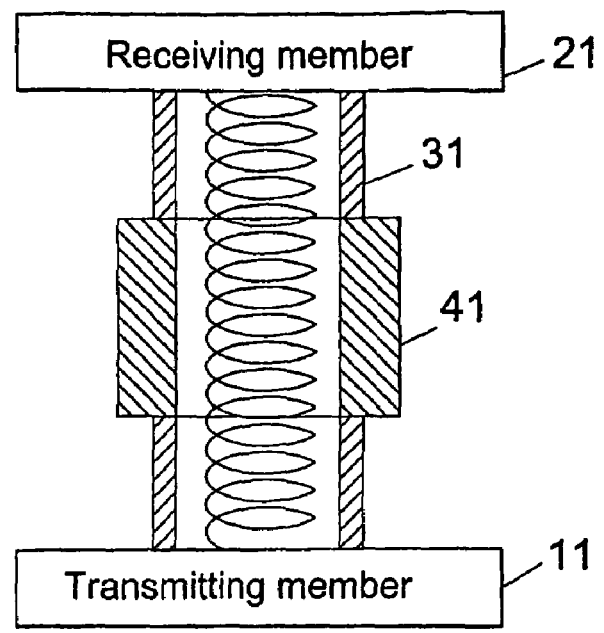
FIG. 6 is a schematic diagram of an embodiment of the present invention in accordance with the principles of the embodiment of FIG. 1.

FIG. 6 illustrates an alternative embodiment of the present invention in accordance with the principles of the embodiment of FIG. 1 in which a transmitting member 11 is mounted to a receiving member 21 by a mount arrangement comprising a spring arrangement 31 arranged concentrically within a force actuator 41 connected between the transmitting member 11 and the receiving member 21.

Figure 7:
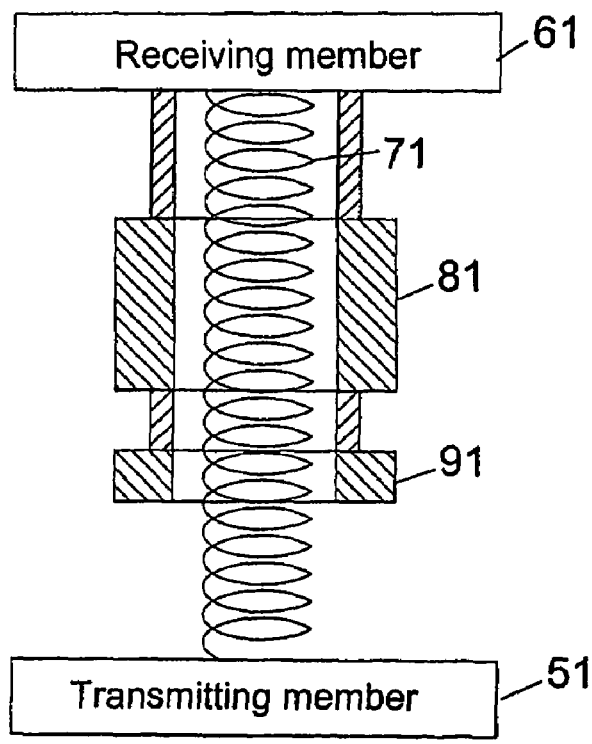
FIG. 7 is a schematic diagram of an embodiment of the present invention in accordance with the principles of the embodiment of FIG. 2.

FIG. 7 illustrates an alternative embodiment to the present invention in accordance with the principles of the embodiment of FIG. 2 in which a transmitting member 51 is coupled to a receiving member 61 via a spring arrangement 71. The spring arrangement 71 is arranged concentrically within a force actuator 81 and a mass 91. The force actuator 81 is coupled between the mass 91 and the receiving member 61 to apply a controlling force to the receiving member 61.

In the embodiments of FIGS. 2, 5 and 7, although the mass is shown separately to the force actuator, the force actuator will generally require a mass against which to react. For example, in an electromagnetic actuator there are two mutually moving components comprising a coil member and a magnet member. Either one of these can act as the mass. Typically, the magnet member comprises a magnetic circuit surrounding the coil member to provide the electromotive force. It is thus convenient for the magnet member to form the mass for providing the inertial force.

So far in the embodiments described hereinabove, no consideration has been given as to how the force actuation arrangement is controlled to perform the force actuation. In all of the embodiments, the force actuation arrangement is primarily controlled in accordance with vibrations detected by a reference sensor associated with the transmitting member to provide signals indicative of vibrations to be transmitted through the spring arrangement. Thus the control of the force actuation comprises a feedforward control system. Feedforward control systems are well known in the art and require advanced notice of a vibration upstream for control downstream. The spring arrangement provides for the delay to enable the reference sensor to detect an upstream vibration component for cancellation downstream, i.e. at the receiving member.

In the embodiments of the present invention described hereinabove, the spring arrangement can comprise any suitable spring arrangement to provide the delay. For example, the spring arrangement can comprise a helical spring or a leaf spring. Any arrangement which preferably provides a stiffness that does not substantially vary with frequency can be used. The present invention is not limited to the use of metal springs. In helical springs one of the properties of the spring which provides the delay is the mass per unit length. The length of the spring will also effect the delay. These properties can be independent of the stiffness. For example, a light spring can provide the same stiffness as a heavy spring. However, a heavy or long spring provides for a longer delay than a light or short spring. Thus in order to provide the required properties for an active vibration isolation mount, a stiff spring is required to provide for a strong static coupling, and the mass per unit length or length is required to be large enough to provide the required delay for feedforward vibration control. Other factors that affect the delay in a spring arrangement are other shape and configuration parameters.

Figure 8:
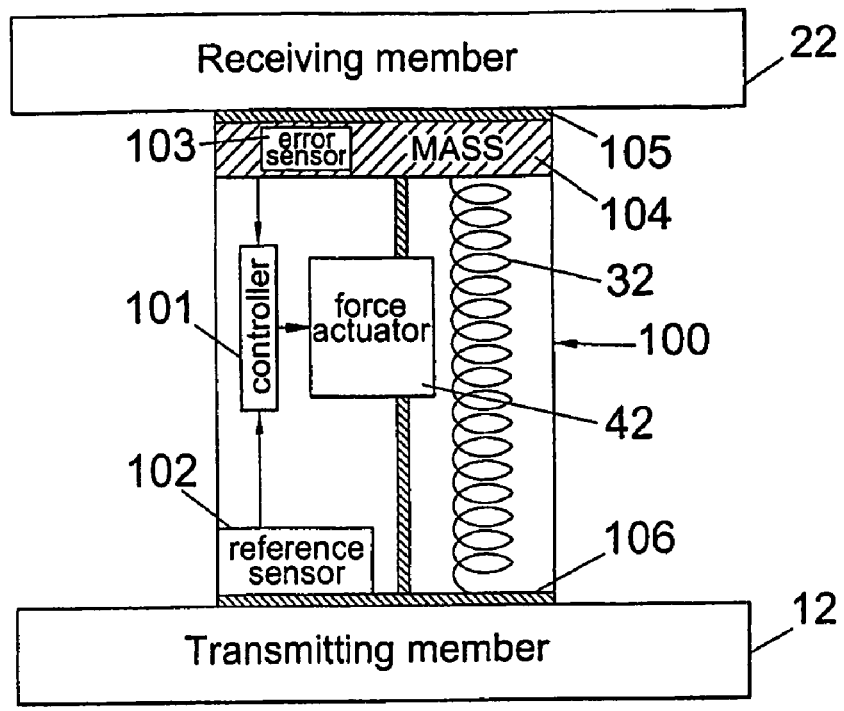
FIG. 8 is a schematic diagram illustrating in more detail an embodiment of the present invention in accordance with the principles of FIG. 1.

FIG. 8 is a schematic diagram of an embodiment of the present invention in accordance with the principles of the embodiment of FIG. 1. An active mount 100 is arranged between a transmitting member 12 and a receiving member 22 to mount the receiving member 22 to the transmitting member 12. The mount 100 includes couplings 105 and 106 for coupling the mount 100 to the receiving member 22 and the transmitting member 12 respectively. A blocking mass 104 is mounted on the coupling 105. A spring arrangement 32 is provided between the coupling 106 and the blocking means 104 to stiffly statically mount the receiving member 22 to the transmitting member 12. A force actuator arrangement 42 is provided coupled between the blocking mass 104 and the coupling 106 in order to provide the controlling force on the receiving member 22. A reference sensor 102 is mounted on the coupling 106 in order to detect vibrations in the transmitting member which are transmitted through the spring arrangement 32 to the receiving member 22. A controller 101 is provided for receiving the output of the reference sensor 102 in order for generating a controlling signal to control the force actuator arrangement 42. An error sensor 103 is mounted on the coupling 105 for detecting vibrations in the receiving member 22. The output of the error sensor 103 is input to the controller 101 to provide a feedback signal for control of the force actuator arrangement 42. Thus in this embodiment of the present invention, the force actuator arrangement is controlled by a controller 101 which carries out a feedforward and feedback control.

Figure 9:
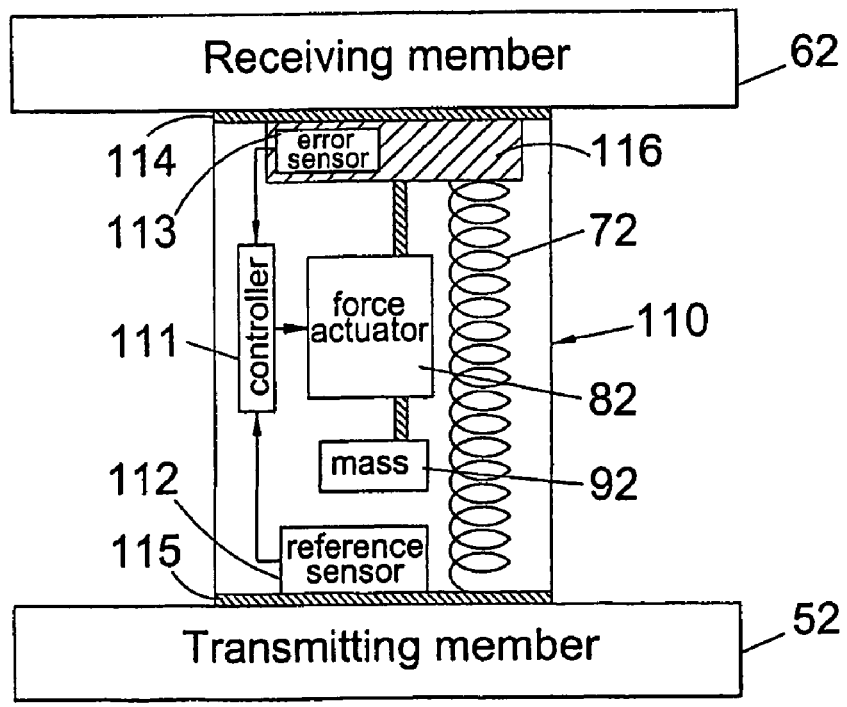
FIG. 9 is a schematic diagram illustrating in more detail an embodiment of the present invention in accordance with the principles of the embodiment of FIG. 2.

FIG. 9 illustrates an embodiment of the present invention in accordance with the principles of the embodiment of FIG. 2. In this embodiment a mount 110 mounts a receiving member 62 to a transmitting member 52. The mount includes couplings 114 and 115 for coupling the mount 110 to the receiving member 62 and the transmitting member 52 respectively. A blocking mass 116 is mounted on the coupling 114. A spring arrangement 72 is coupled between the coupling 115 and the blocking mass 116. A force actuator 82 is provided coupled to the blocking mass 116 to provide a force to the receiving member 62. An inertial mass 92 is provided coupled to the force actuator 82 to enable the force actuator 82 to apply an inertial force to the receiving member 62. A controller 111 is provided for generating control signals to control the force actuator 82. A reference sensor 112 is mounted on the coupling 115 to detect vibrations in the transmitting member. The controller 111 receives signals from the reference sensor 112 and controls the force actuator 82 accordingly. An error sensor 113 is mounted on the coupling 114 to detect vibrations in the receiving member 62. The controller 111 receives the signals from the error sensor 113 in order to control the force actuator 82 accordingly. Thus the controller 111 performs a combined feedforward and feedback control.

Although in the embodiments of FIGS. 8 and 9 single error and reference sensors are illustrated, any suitable error sensing arrangement can be used. The error sensors can comprise a number of sensors arranged in any suitable position to detect vibrations in the receiving member 62 and the transmitting member 52 respectively. Conveniently, the sensors are arranged within the mount 100 and 110. However, the sensors can be provided for direct mounting on the receiving member 62 and/or the transmitting member 52.

The embodiments of FIGS. 8 and 9 are schematic and although the spring and force actuator are illustrated as being side-by-side, they can be positioned in any suitable arrangement for providing for parallel actuation. Conveniently, in order to avoid shear forces between the force applied by the force actuation and the force applied by vibrations through the spring arrangement, the force actuator and the spring arrangement are arranged concentrically as for example illustrated in FIGS. 4 to 7.

In the embodiments of FIGS. 8 and 9 the controllers 101 and 111 perform a combined feedforward and feedback control, i.e. an adaptive feedforward control system. The controller thus conveniently comprises a programmable device for performing a control algorithm. Such control algorithms are well-known in the art (see for example "Adaptive Signal Processing" by B. Widrow and S. D. Stearns, Prentice Hall Signal Processing Series, 1985, the content of which is hereby incorporated by reference). Conventionally, adaptive feedforward control systems rely on the reference signal not being corrupted by the controlling force. However, this is often not the case due to leakage back of corrupting control signals. This is particularly the case in the example of the embodiment of FIG. 1. The controllers 101 and 111 can thus carry out a control algorithm such as that described in UK patent application no. GB 0311085.5, the content of which is hereby incorporated by reference.

Although in the embodiments of FIGS. 8 and 9 the controllers 101 and 111 are illustrated as residing within the mounts 100 and 110, the controllers can be provided separately, i.e. one per mount, or centrally, i.e. one per plurality of mounts.

In the embodiments of the present invention the actuator can comprise any suitable actuator such as an electromagnetic actuator, a piezo electric actuator, a hydraulic actuator, a magnetostrictive actuator, an electrostatic actuator, a pneumatic actuator or a thermal expansive actuator.

Figure 10:
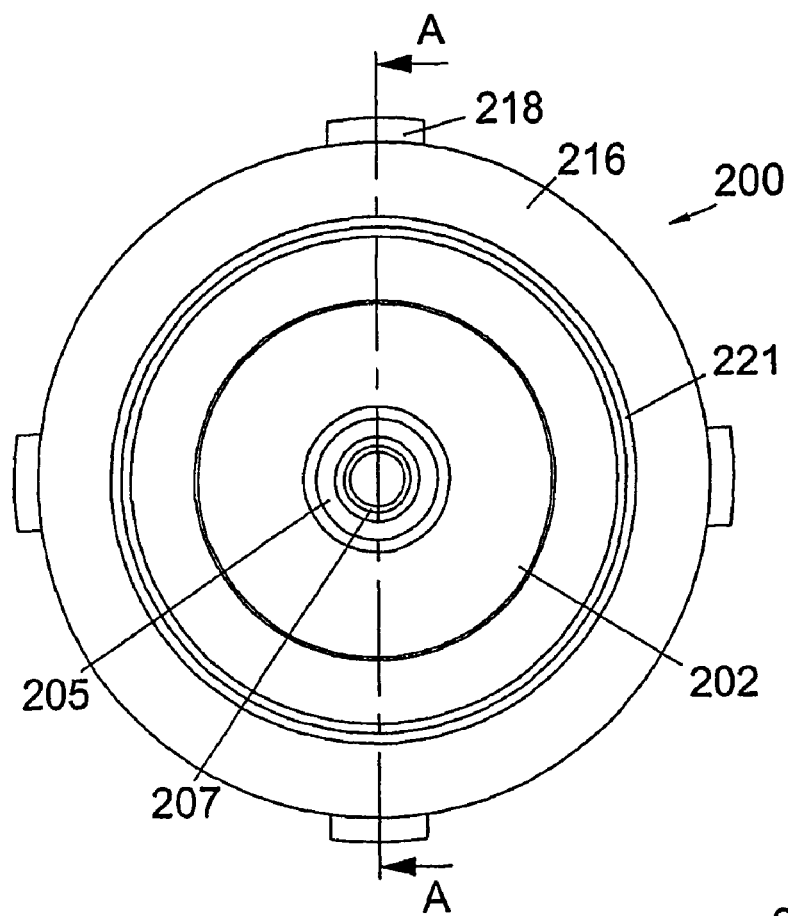
FIG. 10 is a diagram of a front view of a mount in accordance with an embodiment of the present invention in accordance with the principles of the embodiment of FIG. 1.
Figure 11:
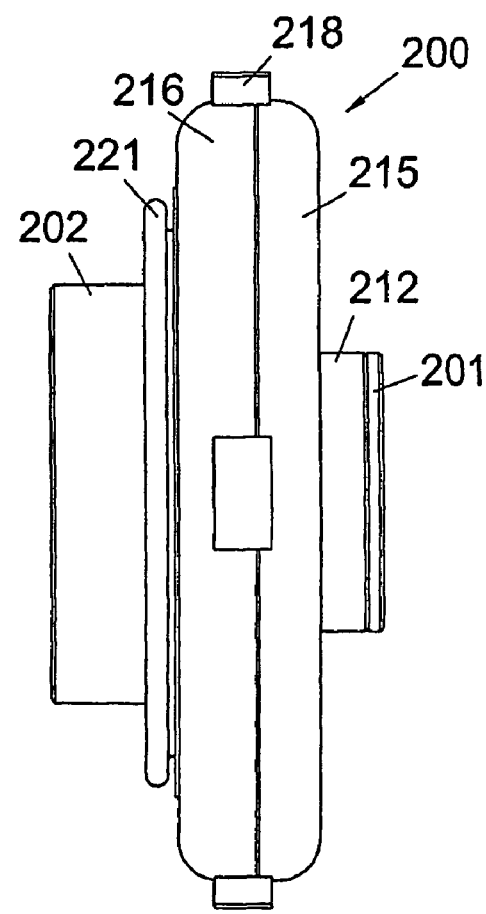
FIG. 11 is a side view of the embodiment of FIG. 10.
Figure 12:
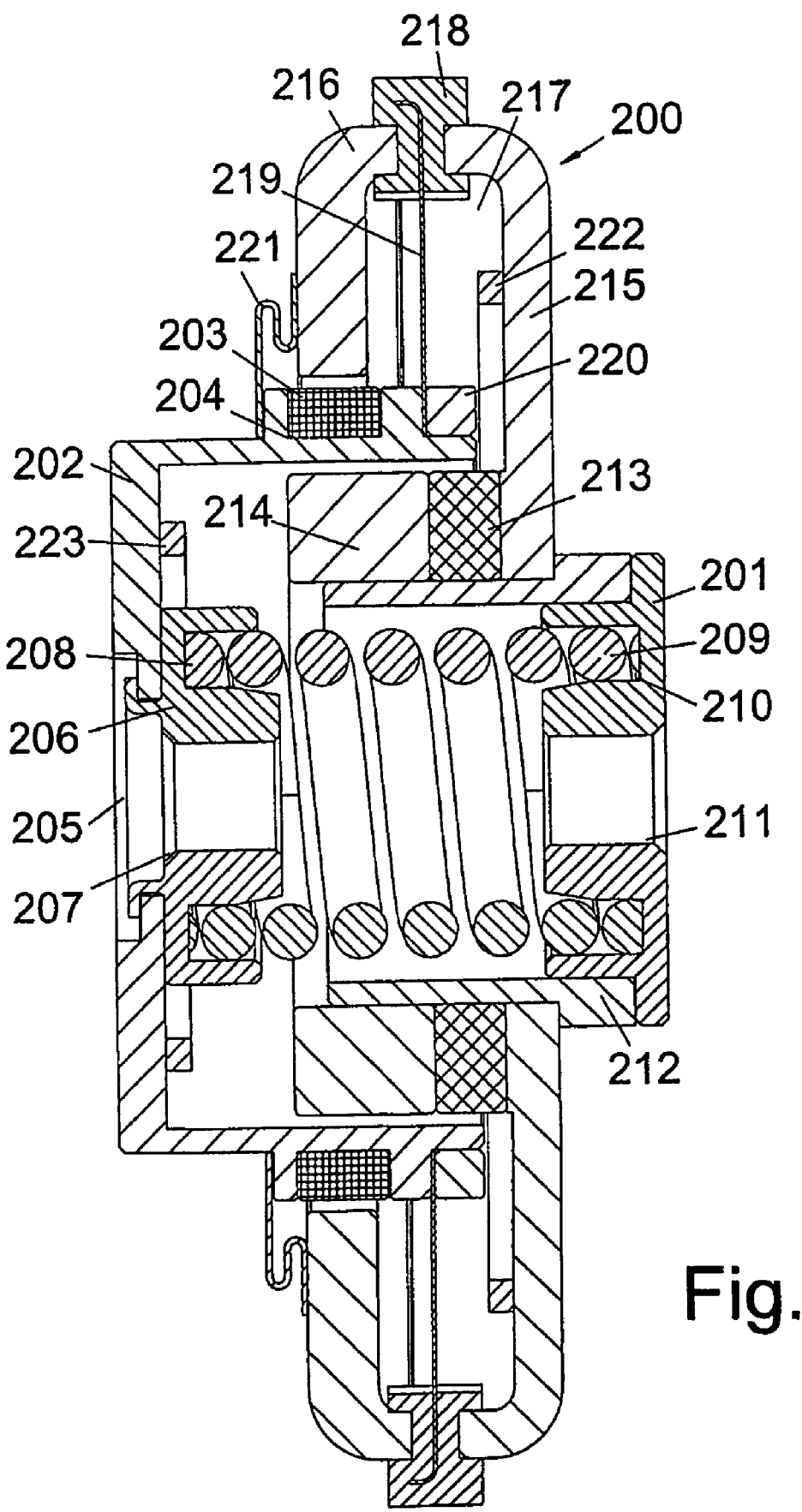
FIG. 12 is a cross-sectional view AA of the embodiment of FIG. 10.

A mount is illustrated in FIGS. 10, 11 and 12, which comprises a specific detailed embodiment of the schematic embodiment illustrated in FIG. 1. The mount 200 comprises a cap 201 for mounting to a receiving member and a coil frame 202 for mounting to a transmitting member. The coil frame is cup-shaped and carries an annular coil 203 within an annular channel 204 on an external circumference of the coil frame 202. The coil frame 202 is mounted coaxially with the cap 201 and is provided with an aperture 205 for receiving a spring seat 206. The spring seat 206 has an inner threaded portion 207 and an annular recess 208 for receiving a helical spring 209. The helical spring 209 sits in the annular recess 208, the spring seat 206 and extends axially towards the cap 201. The cap 201 is provided with an annular recess 210 for receiving the other end of the helical spring. The cap 201 is also provided with an inner threaded portion 211. The inner threaded portions 207 and 211 provide for the coupling of the mount 200 to a transmitting member and a receiving member respectively.

The cap 201 lies within a spring seat sleeve 212 which extends coaxially with the spring 209 towards the spring seat 206. A magnet 213 is provided around a circumferential position of a spring seat sleeve adjacent to the magnet 213 there is provided an annular iron member 214 arranged to lie at an inner circumferential position to the coil 203. The annular iron member 204 lies to one side of the magnet 213. To the other side of the magnet 213 lies a second annular iron member 215 which extends away from the spring seat sleeve 212 and curves around to extend over an end of the coil frame at a distant radial position. A third iron member 216 is provided and comprises an annular member lying adjacent to the coil 203 and extending away from the coil 203. The second and third iron member 215 and 216 meet each other and are connected at their outer radial positions to form an annular cavity 217 at four quadrant positions around the circumference of the second and third iron members 215 and 216, resilient members 218 are provided for supporting support arm 219. The four support arms 219 extend radially from the coil frame 202 and are held in place by a locking ring 220.

A seal 221 is provided between the coil frame 202 and the third iron member 216 to seal the gap between the coil 203 and the third iron member 216 to thus provide a seal on the unit.

The helical spring 209 provides for the strong static coupling between the two sides of the mount 200 to thus enable the strong passive coupling of first member to the second member.

In this embodiment the coil 203 is mechanically coupled to the coil frame 202 which in turn is coupled to the first member, i.e. a transmitting member. For application of the mount to mounting of trim panels to an aircraft air frame, provision of the coil on the coil frame enables heat to be dissipated to the air frame.

The spring 209 provides for a reduction of the transmission vibrations along the axis. The application of current to the coil 203 will generate a force which is applied between the coil frame and cap. Relative movement between the coil 203 carried on the coil frame 202 and the iron members 214, 215, 216, magnet, spring seat sleeve and cap 201 causes the bending of the support arms 219. The support arms 219 have a low stiffness in the axial direction and a strong stiffness in the perpendicular direction. Thus they provide for strong support of the magnetic components in the magnetic circuit formed by the iron members 213, 214 and 215 relative to the coil frame 202. They also provide the stiffness in a shear direction. The support arms 219 are mounted in the resilient members 218 to allow for the change in radial length of the support arms 219 caused by the relative axial displacement of the coil frame 202 and the magnetic circuit comprised of the iron members 214, 215 and 216.

As illustrated in FIG. 12, sensor rings 222 and 223 of piezo electric material is provided within the mount for sensing vibrations. A first piezo electric sensor 223 is provided in the coil frame 222 for sensing vibrations coming from the first member i.e. the feedforward or reference signal and a second piezo electric sensor 222 is provided in the second iron member 215 for sensing vibrations in the second member i.e. the feedback or error signal. In this embodiment the piezo electric sensors 222 and 223 are annular and substantially concentric with the axis of the mount. This enables the sensors to detect the axial vibrations in the first and second members. Any axially symmetric sensing arrangement can be used in place of the ring sensors 222 and 223.

It can thus be seen that this embodiment of the present invention provides for a coaxial spring mount and electromagnetic actuator acting between the two sides of the mount. The electromagnetic actuator is formed by the coil 203 lying within a magnetic circuit comprised of the iron members 214, 215 and 216 and the magnet 213. It can be seen in FIG. 12 that the coil 213 has an axial length which is greater than the axial length of the third iron member 216. The reason for this is to ensure that the coil 203 always lies within the magnetic field provided between the third iron member 216 and the first iron member 214, i.e. to ensure no edge effects caused by an edge of the coil 203 entering into the field region between the third iron member 216 and the first iron member 214. Although in this embodiment the coil 203 is shown as being sufficiently long in the axial direction so as to ensure no edge ever enters the region between the third iron member and the first iron member, in an alternative embodiment the coil 203 can be shorter in axial length than the third iron member so that an edge of the coil never leaves the field region between the third iron member and the first iron member.

It can be seen in the embodiment of FIGS. 10 to 12 that the magnetic circuit comprised of the iron members 214, 215 and 216 comprises a more massive component than the coil 203 and the coil frame 202. Thus in this embodiment the iron members 214, 215 and 216 and the magnet 213 comprise a mass which is coupled to the cap 201 and provides a blocking mass on the receiving end of the mount.

Although not shown in the embodiments of FIGS. 10 to 12, when the mount 200 is coupled to first and second members to provide active vibration isolation therebetween, the mount 200 is attached by screws to the first and second members. The screws thread into the threaded portions 207 and 211. The attachment of the mount to the second member is by way of a rotational decoupling device e.g. a pin or ball joint to allow for the shear rotational decoupling of the mounting of the second member to the first member while still supporting shear loads. A grommet can be used, which can for example be made out of rubber, for attachment to the second member, i.e. for attachment around the screw threaded into the threaded portion 211. The rubber grommet between the thread fitted into the threaded portion 211 and the second member (i.e. the receiving member) allows for bending, i.e. rotation about any axis and effectively provides a pin joint at the receiving end. The mounting of the coil frame 202 via the threaded portion 207 to the first member is stiff.

A controller for controlling the actuation of the electromagnetic actuator in this embodiment of the present invention can be provided separately or attached to the mount 200.

Figure 13:
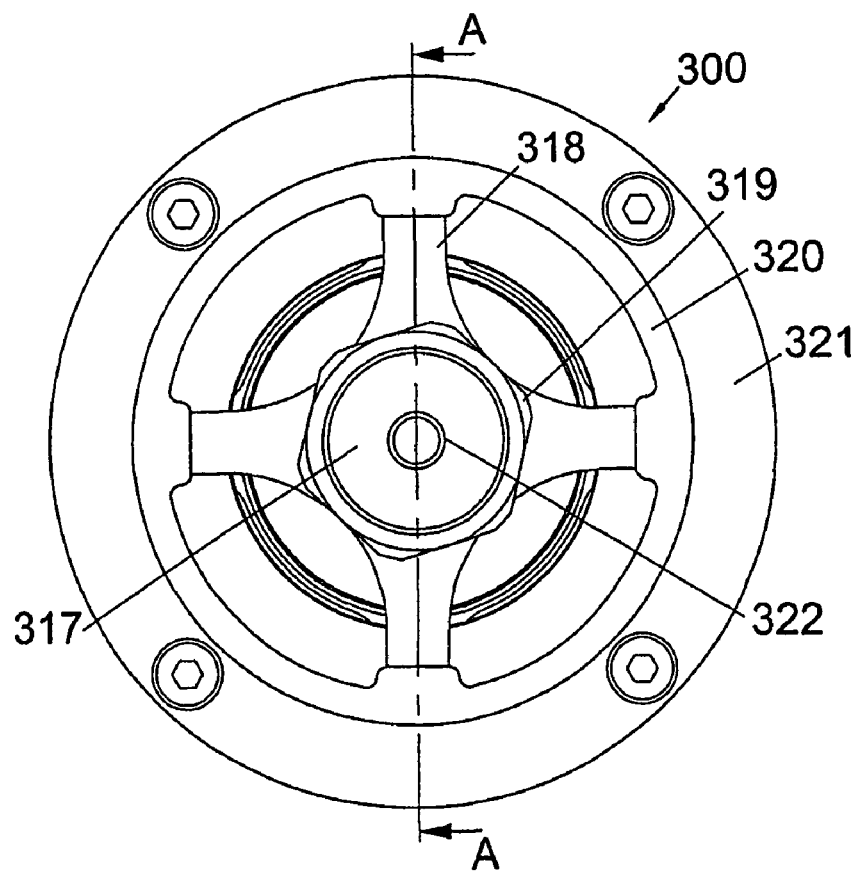
FIG. 13 is a diagram of a front view of an embodiment of the present invention in accordance with the principles of the embodiment of FIG. 2.
Figure 15:
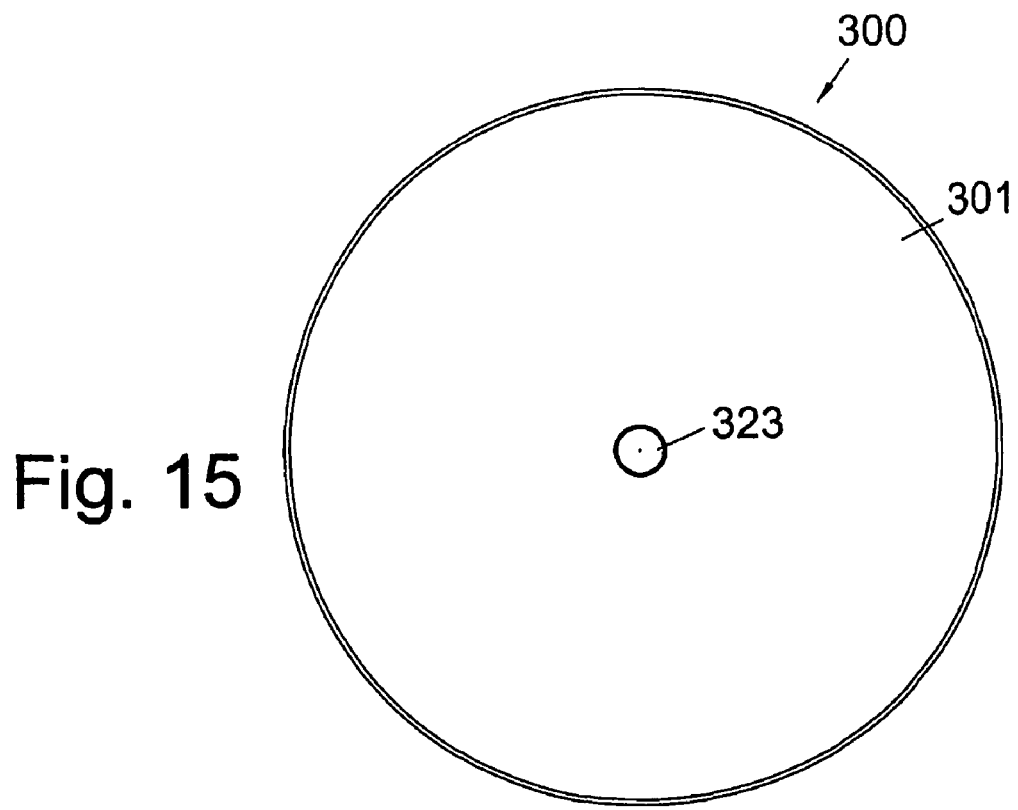
FIG. 15 is a rear view of the embodiment of FIG. 13.
Figure 14:
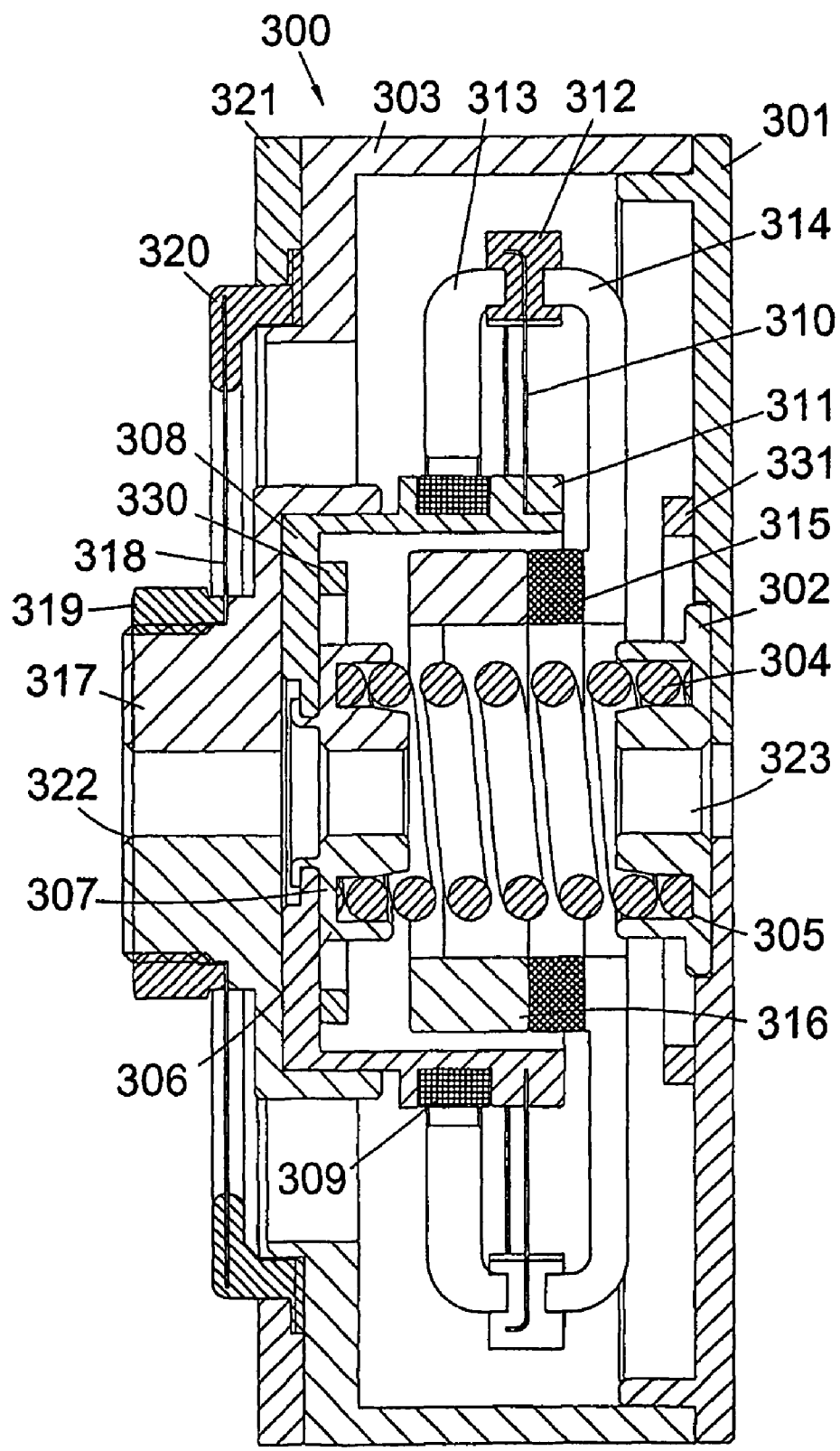
FIG. 14 is a cross-sectional view AA of the embodiment of FIG. 13.

A second specific embodiment of the present invention in accordance with the principles of the embodiment of FIG. 2 will now be described with reference to FIGS. 13 to 15.

An annular casing plate is provided on an axis coaxially with a spring seat 302, a cup-shaped casing body 303 is provided coupled to the casing plate 301 to provide a housing. Within the housing a helical spring 304 extends along the axis. The helical spring 304 sits at one end within an annular recess 305 within the spring seat 302. The other end of the helical spring 304 lies in annular recess 306 in a second spring seat 307. The second spring seat 307 is connected to a cup-shaped coil frame 308. The coil frame 308 extends axially over the spring 304. An annular coil 309 lies at an outer circumferential position at an axial position along the coil frame 308. A magnetic circuit is suspended from the axial end of the coil frame 308 on support arms 310. The support arms 310 radially extend from quadrant positions at the axial end of the coil frame 308 and are locked in place at an inner radial position thereof by a locking ring 311. At outer radial positions the support arms 310 are mounted in resilient members 312. The resilient members 312 lie within and support the magnetic circuit. Resilient members 312 are held between a first magnetic member 313 and a second magnetic member 314. The first magnetic member 313 comprises a generally annular member extending radially inwards towards the coil 309 to lie adjacent the coil 309. The second magnetic member 314 comprises an annular member extending radially inwardly from the resilient members 312 to a radial position inward of the coil frame 308. An annular magnet 315 is provided adjacent to the radially inner portion of the second magnetic member 314. A third magnetic member 316 comprises an annular member which lies adjacent to the magnet 315 in an axial position. The first magnet member 313 and the third magnet member 316 lie in radially opposed positions either side of the annular coil 309. Thus the first magnet member 313, the second magnet member 314, the third magnet member 316 and the magnet 315 form the magnetic circuit in which the coil 309 lies. The magnetic circuit is relatively heavy compared to the coil frame and the coil and it thus provides the inertial mass suspended by the support arms. In this embodiment of the present invention, the electromagnetic actuator includes the inertial mass.

The resilient members 312 are provided to allow for the radial length variations of the support arms 310 as the electromagnetic actuator causes the relative movement of the magnetic circuit and the coil 309. The support arms 310 are low in stiffness in the axial direction and strong in stiffness in the radial direction, thereby providing for support for the magnetic circuit and the inertial mass which in this embodiment comprise the same components.

A coil frame 308 is connected to a base 317, support arms 318 radially extend from the base 317 and are held to the base 317 at inner radial positions thereof by a locking ring 319. At their outer radial ends the support arms 318 are connected to a resilient support ring 320 which sits on the casing body 303 and is locked in place thereon by a locking ring 321.

The base 317 is for coupling to the receiving member via a threaded portion 322 to provide for rotation along the axis, the bolt threaded into the threaded portion 322 is threaded through a grommet in the second member so that there is a resilient grommet connection between the second member and the base 317 to provide a pin joint. To connect the casing plate 301 to the transmitting member, a hole is provided in the casing to allow a bolt to be inserted into a threaded portion 323 in the spring seat 302. The connection made to the transmitting member by the bolt is fixed to provide a solid connection between the casing plate 301 and the spring seat 302 and the transmitting member.

A reference sensor 331 in the form of a piezoelectric ring is provided mounted on the casing plate 301. An error sensor 330 in the form of a piezoelectric ring is provided mounted on the coil frame 308.

It can thus be seen in this embodiment, as illustrated schematically in FIG. 7, the electromagnetic actuator lies coaxially about the spring. Also the inertial mass lies concentrically around the spring and in this embodiment the inertial mass comprises the magnetic circuit of the electromagnetic actuator. The electromagnetic actual components are not physically connected to the transmitting member. There is no coupling with any axial stiffness between the base 317 and the casing plate 301 and the spring seat 302. The support arms 318 provide for the axially stiff decoupling of the body 317 and the casing plate 301 (and the spring seat 302). There is thus no axially stiff coupling between the two sides of the mount 300.

It can be seen from the above embodiments that the present invention is primarily concerned with the reduction of transmission of vibrations in a direction perpendicular between two objects or members.

The present invention has application where it is necessary to mount two bodies and it is desirable to prevent the transfer of vibrations from one body to the other while firmly mounting the bodies together.

The present invention has particular application in the aircraft industry for the mounting of trim panels to the aircraft air frame. When an aircraft is flying, around the skin of the aircraft there is generated boundary layer field pressure fluctuations. These pressure fluctuations are generally subsonic and thus they are not well coupled between the airframe and the cabin via the air/insulation gap therebetween. They are instead primarily transmitted through the trim panel mounts which in the prior art have comprised elastomeric members. The embodiments of the present invention have a broadband frequency capability and are thus ideally suited to the control of vibrations generated by the turbulent boundary layer pressure variations. In an aircraft the active vibration isolation mounts can replace some or all of the conventional passive mounts to provide a reduction of the transmission of vibrations from the airframe to the trim panels. Each mount can be controlled independently by a controller either provided with a mount in the unit, or provided separately. Alternatively, a plurality of mounts can be controlled from a single controller. A controller receives the reference (feedforward) and error (feedback) signals from the sensors and generates respective control signals. Each mount is controlled independently.

The present invention is applicable to any situation where broadband vibration isolation is required. It can, of course, also be applied to tonal noise. For example, the mounts can be used as engine mounts for an engine that operates over a wide range of frequencies. The use of the active vibration isolation mounts will reduce the transmission of vibrations from the engine to the framework in which the engine is mounted. The provision of the active control in the active vibration mount enables control of low frequencies. When an engine is started up, as it begins to start, if no active control is provided, then severe vibration can be transmitted to the framework holding the engine. The active vibration isolation mount reduces this vibration. Thus the active vibration mount is particularly useful for an engine which is repeatedly started and stopped and thus generates a broad range of vibration frequencies. It can also be used as a mount in an environment subject to broadband combustion flow noise.

The present invention encompasses not just the active vibration mount and its method of operation, but also the design and manufacture of such a mount. In the design of such a mount, sensors must be selected, the actuator must be designed to apply the force to the receiving member and the spring arrangement must be designed to lie between the transmitting member and the receiving member and to provide the necessary delay between the transmitting member and the receiving member to allow for the feedforward control of the generation of the controlling force on the receiving member. Thus the design of the mount requires the designing of the spring arrangement to provide such a delay. Some of the parameters that can affect delay are the mass per unit length, the length of the spring, the shape of the spring, and the type of spring configuration. In one embodiment where the spring arrangement comprises a helical spring, the spring is chosen to provide a mass per unit length and length which is sufficient to provide the required delay. A typical delay required for feedforward active control is 200 μsec. This can readily be achieved by selecting a spring having an appropriate mass per unit length. Further, the selection of the spring requires the selection of a spring having a force per unit displacement which remains substantially constant with frequency. Embodiments which use metal springs provide such a requisite response. However, the present invention encompasses any other form of spring means which can provide the required physical behaviour.

This embodiment of the invention also includes the selection of an appropriate blocking mass and an inertial mass, where used, to provide for efficient vibration isolation. The mass, shape and mass distribution or number of masses can be designed appropriately.

The present invention encompasses passive vibration isolation mounts. One such mount is illustrated schematically in FIG. 16. A first member 1000 is a member through or from which vibrations can be transmitted to a second member 1001 by a mount 1005 for mounting the second member 1001 to the first member in a spaced relationship. The mount comprises a spring arrangement 1002 which is coupled at one end thereof to the first member 1000 and a blocking mass 1003 which is positioned between the second member 1001 and the spring arrangement 1003 so as to lie at the other end of the spring arrangement 1002. Thus the spring arrangement 1002 provides a spring force between the first member 1000 and second member 1001 via the blocking mass 1003. Mounting arrangements 1006 and 1007 are provided for mounting the mount 1005 to the first member 1000 and the second member 1001 respectively.

The blocking mass 1003 comprises a mass provided in or adjacent to a region between the second member 1001 and the second mounting arrangement 1007 to increase the localised mass of the second member 1001 at the point of mounting of the mount to the second member 1001. This increases the efficiency of the mount. The blocking mass can comprise a single mass or a distribution of masses arranged substantially coaxially with the spring arrangement.

Figure 16:
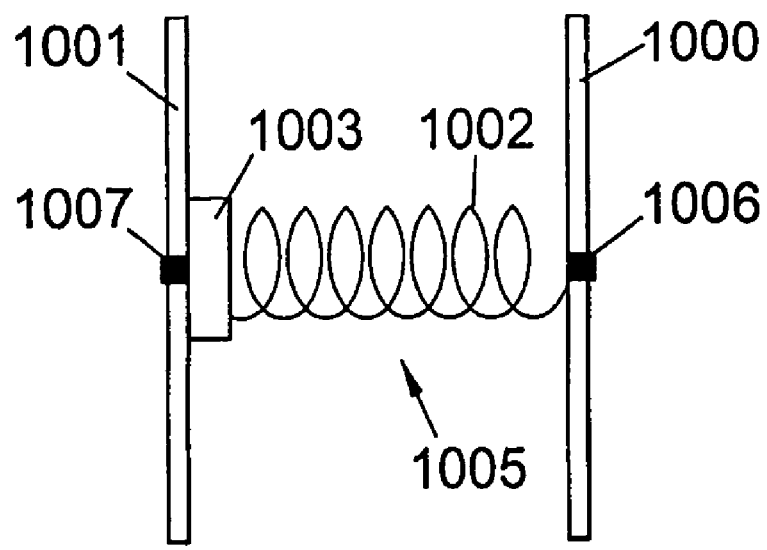
FIG. 16 is a schematic diagram of a passive vibration isolation mount in accordance with one embodiment of the present invention.

Although a helical spring arrangement is illustrated in FIG. 16, any spring arrangement comprising a single spring or combination of springs can be used. A spring member can be a leaf spring, a coil spring or any other spring material or structure to provide a spring force.

Figure 17:
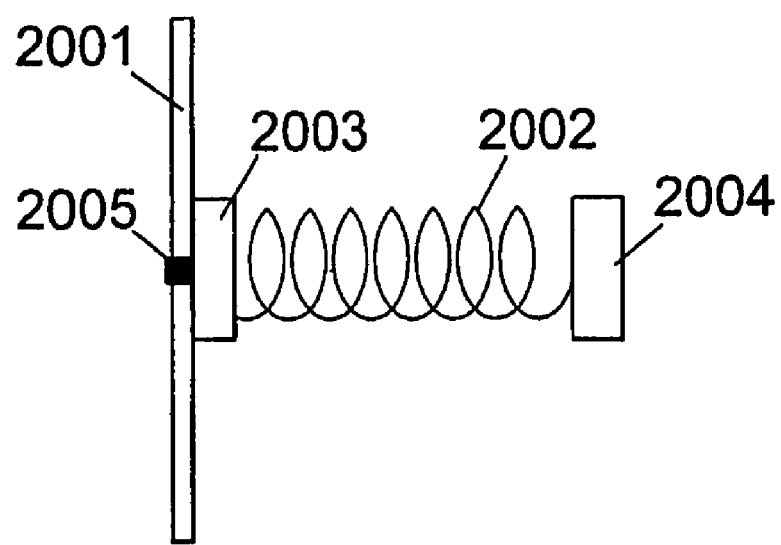
FIG. 17 is a schematic diagram of a vibration absorber in accordance with one embodiment of the present invention.

The present invention also encompasses a vibration absorber as illustrated schematically in FIG. 17. A blocking mass 2003 is mounted to a member 2001 by a mounting arrangement 2005. A spring arrangement 2002 is mounted at one end thereof on the blocking mass 2003. On the other end of the spring member 2002 an inertial mass 2004 is mounted. The spring member thus provides a spring force between the blocking mass 2003 and the inertial mass 2004.

The blocking mass 2003 comprises a mass provided in or adjacent to a region between the member 2001 and the vibration absorber to increase the localised mass of the member 2001 at the point of mounting of the absorber to the member 2001. This increases the efficiency of the vibration absorber.

The blocking mass can comprise a single mass or a distribution of masses arranged substantially coaxially with the spring arrangement.

This arrangement provides a tuned vibration absorber which more efficiently couples to the member 2001 to absorb vibrations in the member.

Although a helical spring arrangement is illustrated in FIG. 17, any spring arrangement comprising a single spring or combination of springs can be used. A spring member can be a leaf spring, a coil spring or any other spring material or structure to provide a spring force.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An active vibration isolation mount for mounting a first member to a second member and for reducing the transmission of vibrations from said first member to said second member, the active vibration isolation mount comprising:
   first mounting means for mounting to said first member;
   second mounting means for mounting to said second member;
   spring means arranged between said first and second mounting means;
   sensing means for sensing vibrations in said first member; and
   force means for applying a controlling force to said second mounting means in response to a control signal from control means responding to the vibrations sensed by said sensing means;
   wherein said spring means is adapted to provide a delay between said first and second mounting means equal to or greater than a delay in the application of the controlling force by said force means in response to the vibrations in said first member.

2. An active vibration isolation mount according to claim 1, wherein said sensing means is arranged to sense vibrations in said first mounting means.

3. An active vibration isolation mount according to claim 1, wherein said force means and said spring means act in parallel.

4. An active vibration isolation mount according to claim 1, wherein said force means and said spring means are arranged substantially concentrically or symmetrically about a direction extending between said first and second mounting means.

5. An active vibration isolation mount according to claim 1, wherein said spring means has a stiffness in a first direction extending between said first mounting means and said second mounting means that does not vary substantially with the frequency of the vibrations.

6. An active vibration isolation mount according to claim 1, wherein said spring means has a mass per unit length and length selected to provide said delay.

7. An active vibration isolation mount according to claim 1, wherein said delay in the application of the controlling force by said force means is delay incurred by said sensing means, said force means and said control means.

8. An active vibration isolation mount according to claim 1, wherein said sensing means, said spring means and said force means are adapted to provide broadband vibration isolation.

9. An active vibration isolation mount according to claim 1, wherein said spring means has a high static stiffness to provide for the static stiff mounting of said second member on said first member.

10. An active vibration isolation mount according to claim 1, including an error sensing means for sensing vibrations in said second member, wherein said force means is adapted to apply a controlling force to said second mounting means in response to a control signal from said control means responding to the vibrations sensed by said sensing means and said error sensing means.

11. An active vibration isolation mount according to claim 1, wherein said spring means comprises at least one spring.

12. An active vibration isolation mount according to claim 1, wherein said spring means comprises at least one coil spring.

13. An active vibration isolation mount according to claim 1, wherein said force means is connected between said first mounting means and said second mounting means to apply said controlling force to said second mounting means.

14. An active vibration isolation mount according to claim 13, wherein said force means comprises an electromagnetic actuator.

15. An active vibration isolation mount according to claim 14, wherein said electromagnetic actuator comprises a coil member coupled to said first mounting means and a magnetic member coupled to said second mounting means.

16. An active vibration isolation mount according to claim 15, wherein said magnetic member is heavier than said coil member and provides a blocking mass connected to said second mounting means.

17. An active vibration isolation mount according to claim 15, wherein said coil member and said magnetic member are coupled by coupling means providing low stiffness in a first direction extending between said first and second mounting means and high stiffness in any perpendicular direction.

18. An active vibration isolation mount according to claim 13, including a blocking mass coupled to said second mounting means.

19. An active vibration isolation mount according to claim 1, including a blocking mass, wherein said force means is connected between said blocking mass and said second mounting means to apply said controlling force to said second mounting means.

20. An active vibration isolation mount according to claim 19, wherein said force means comprises an electromagnetic actuator.

21. An active vibration isolation mount according to claim 20, wherein said electromagnetic actuator comprises a coil member and a magnetic member and said coil member or said magnetic member comprises said blocking mass.

22. An active vibration isolation mount according to claim 21, wherein said magnetic member comprises said blocking mass and said coil member is coupled to said second mounting means.

23. An active vibration isolation mount according to claim 21, wherein said coil member and said magnetic member are coupled by coupling means providing low stiffness in a first direction extending between said first and second mounting means and high stiffness in a perpendicular direction.

24. An active vibration isolation mount according to claim 1, wherein said second mount means includes a pin joint for mounting to said second member to isolate the mount from said second member for all modes of vibration except vibration in the direction between said first and second members.

25. An active vibration isolation mount arrangement comprising:
an active vibration isolation mount for mounting a first member to a second member and for reducing the transmission of vibrations from said first member to said second member, the active vibration isolation mount comprising:
first mounting means for mounting to said first member;
second mounting means for mounting to said second member;
spring means arranged between said first and second mounting means;
sensing means for sensing vibrations in said first member; and
force means for applying a controlling force to said second mounting means in response to a control signal from control means responding to the vibrations sensed by said sensing means; and
control means for generating said control signal in response to the vibrations sensed by said sensing means;
wherein said spring means is adapted to provide a delay between said first and second mounting means equal to or greater than a delay in the application the controlling force by said force means in response to the vibrations in said first member.

26. An active vibration isolation mount arrangement comprising:
a plurality of active vibration isolation mounts for mounting a first member to a second member and for reducing the transmission of vibrations from said first member to said second member, each active vibration isolation mount comprising:
first mounting means for mounting to said first member;
second mounting means for mounting to said second member;
spring means arranged between said first and second mounting means;
sensing means for sensing vibrations in said first member; and
force means for applying a controlling force to said second mounting means in response to a control signal from control means responding to the vibrations sensed by said sensing means; and
control means for generating said control signals for said force means in response to the vibrations sensed by each respective said sensing means;
wherein said spring means is adapted to provide a delay between said first and second mounting means equal to or greater than a delay in the application the controlling force by said force means in response to the vibrations in said first member.

27. A method of controlling vibrations transmitted from a first member to a second member when said second member is mounted on said first member using a spring arrangement providing a delay in transmission of an impulse between said first and second members, the method comprising:
sensing vibrations in said first member; and
applying a force on said second member in response to the sensed vibrations to reduce vibrations in said second member;
wherein said spring arrangement provides a delay equal to or greater than a delay in the provision of said force in response to the vibrations in said first member.

28. A method according to claim 27, wherein spring arrangement is mounted on said first member using a first mounting means and said sensing comprising sensing vibrations in said first mounting means.

29. A method according to claim 27, wherein said force and said spring arrangement act in parallel.

30. A method according to claim 27, wherein said force is applied substantially concentrically with said spring arrangement.

31. A method according to claim 27, wherein said spring arrangement is selected to have a stiffness in a first direction extending between a mounting position on said first member and a mounting position on said second member that does not vary substantially with frequency of the vibrations.

32. A method according to claim 27, wherein said spring arrangement is selected to have a mass per unit length and length to provide said delay.

33. A method according to claim 27, wherein said delay in the application of the controlling force is delay incurred by the sensing, and the application of the force in response to the vibrations in said first member.

34. A method according to claim 27, wherein broadband vibration isolation is provided.

35. A method according to claim 27, wherein said spring arrangement is selected to have a high static stiffness to provide for the static stiff mounting of said second member on said first member.

36. A method according to claim 27, including sensing vibrations in said second member, wherein the force is applied to said second member in response to the vibrations sensed in said first member and the vibrations sensed in said second member.

37. A method according to claim 27, wherein said spring arrangement comprises at least one spring.

38. A method according to claim 27, wherein said spring arrangement comprises at least one coil spring.

39. A method according to claim 27, wherein said force is applied from said first member to said second member.

40. A method according to claim 39, wherein said force is applied using an electromagnetic actuator.

41. A method according to claim 40, wherein said electromagnetic actuator comprises a coil member coupled to said first member and a magnetic member coupled to said second member.

42. A method according to claim 41, wherein said magnetic member is heavier than said coil member and provides a blocking mass connected to said second member.

43. A method according to claim 40, wherein said coil member and said magnetic member are coupled by coupling means providing low stiffness in a first direction extending between said first and second members and high stiffness in a perpendicular direction.

44. A method according to claim 39, wherein a blocking mass is coupled to said second member.

45. A method according to claim 27, wherein said force is applied from a blocking mass to said second member.

46. A method according to claim 45, wherein said force is applied using an electromagnetic actuator.

47. A method according to claim 46, wherein said electromagnetic actuator comprises coil member and magnetic member and said coil member or said magnetic member comprises an inertial mass.

48. A method according to claim 47, wherein said magnetic member comprises said inertial mass and said coil member is coupled to said second member.

49. A method according to claim 47, wherein said coil member and said magnetic member are coupled by coupling means providing low stiffness in a first direction extending between said first and second member and high stiffness in a perpendicular direction.

50. A method according to claim 27, further comprising generating a control signal in response to the sensed vibrations for controlling the application of said force.

51. A method of isolating a trim panel mounted on an aircraft frame from vibrations in said aircraft frame caused by subsonic boundary layer noise using a trim mount having a spring arrangement providing a delay in transmission of an impulse between said trim panel and said aircraft frame, the method comprising:
   sensing vibrations in said aircraft frame; and
   applying a force to said trim panel in response to the sensed vibrations to reduce vibrations in said trim panel;
wherein said spring arrangement provides a delay equal to or greater than a delay in the provision of said force in response to the vibrations in said aircraft frame.

52. A method according to claim 51, wherein spring arrangement is mounted on said aircraft frame using a first mount and said sensing comprises sensing vibrations in said first mount.

53. A method according to claim 51, wherein said force and said spring arrangement act in parallel.

54. A method according to claim 51, wherein said force is applied substantially concentrically with said spring arrangement.

55. A method according to claim 51, wherein said spring arrangement is selected to have a stiffness in a first direction extending between a mounting position on said aircraft frame and a mounting position on said trim panel that does not vary substantially with frequency of the vibrations.

56. A method according to claim 51, wherein said spring arrangement is selected to have a mass per unit length and length to provide said delay.

57. A method according to claim 51, wherein said delay in the application of the controlling force is delay incurred by the sensing, and the application of the force in response to the vibrations in said aircraft frame.

58. A method according to claim 51, wherein said spring arrangement is selected to have a high static stiffness to provide for the static stiff mounting of said trim panel on said aircraft frame.

59. A method according to claim 51, including sensing vibrations in said trim panel, wherein the force is applied to said trim panel in response to the vibrations sensed in said aircraft frame and the vibrations sensed in said trim panel.

60. A method according to claim 51, wherein said spring arrangement comprises at least one spring.

61. A method according to claim 51, wherein said spring arrangement comprises at least one coil spring.

62. A method according to claim 51, wherein said force is applied from said aircraft frame to said trim panel.

63. A method according to claim 62, wherein said force is applied using an electromagnetic actuator.

64. A method according to claim 63, wherein said electromagnetic actuator comprises a coil member coupled to said aircraft frame and a magnetic member coupled to said trim panel.

65. A method according to claim 64, wherein said magnetic member is heavier than said coil member and provides a blocking mass connected to said trim panel.

66. A method according to claim 64, wherein said coil member and said magnetic member are coupled by coupling means providing low stiffness in a first direction extending between said aircraft frame and said trim panel and high stiffness in a perpendicular direction.

67. A method according to claim 62, wherein a blocking mass is coupled to said trim panel.

68. A method according to claim 62, wherein said force is applied from an inertial mass to said trim panel.

69. A method according to claim 68, wherein said force is applied using an electromagnetic actuator.

70. A method according to claim 69, wherein said electromagnetic actuator comprises coil member and magnetic member and said coil member or said magnetic member comprises said inertial mass.

71. A method according to claim 70, wherein said magnetic member comprises said inertial mass and said coil member is coupled to said trim panel.

72. A method according to claim 70, wherein said coil member and said magnetic member are coupled by coupling means providing low stiffness in a first direction extending between said aircraft frame and said trim panel and high stiffness in a perpendicular direction.

73. A method according to claim 51, further comprising generating a control signal in response to the sensed vibrations for controlling the application of said force.

74. A method of designing an active mount arrangement for mounting a first member to a second member, comprising:
   selecting a sensor for sensing vibrations in said first member;
   designing an actuator arrangement for providing a force on said second member;
   selecting an active force controller for controlling said actuator in response to the sensed vibrations to reduce vibrations in said second member; and
   designing a spring member for provision between said first and second members to provide a delay in transmission of an impulse between said first and second members equal to or greater than a delay incurred by said sensor, said actuator and said active force controller in the provision of said force in response to the vibrations in said first member.

75. A method according to claim 74, wherein said active force controller and said spring member are designed to act in parallel.

76. A method according to claim 74, wherein said active force controller and said spring member are designed to lie substantially concentrically.

77. A method according to claim 74, wherein said spring member is designed to have a stiffness in a first direction extending between said first member and said second member that does notary substantially with frequency of the vibrations.

78. A method according to claim 74, wherein said spring member is designed to have a mass per unit length and length to provide said delay.

79. A method according to claim 74, wherein said delay is delay incurred by said sensor, said active force controller and said actuator.

80. A method according to claim 74, wherein said sensor, said spring member, said active force controller, and said actuator are adapted to provide broadband vibration isolation.

81. A method according to claim 74, wherein said spring member is designed to have a high static stiffness to provide for the static stiff mounting of said first member to said second member.

82. A method according to claim 74, wherein said actuator is designed to be connected between said first member and said second member to apply said force to said second member.

83. A method according to claim 74, including selecting a blocking mass, and designing said actuator to be connected between said blocking mass and said second member to apply said force to said second member.

84. A method of controlling vibrations transmitted from a first member to a second member when said second member is mounted on said first member, the method comprising:
providing a sensor sensing vibrations in said first member;
providing an actuator arrangement applying a force on said second member;
providing an active force controller to control said actuator in response to the sensed vibrations to reduce vibrations in said second member; and
mounting said second member on said first member using a spring member providing a delay in transmission of an impulse between said first and second members equal to or greater than a delay in the provision of said force by said active force controller in response to the vibrations in said first member.

85. An active mount arrangement mounting a first member to a second member and for reducing the transmission of vibrations from said first member to said second member, the active vibration mount arrangement comprising:
a spring arrangement between said first and second members having a stiffness in a first direction extending between said first and said second members that does not vary substantially with frequency of the vibrations;
a sensor arrangement for sensing vibrations in said first member;
a force actuator for applying a controlling force to said second member; and
a controller connected to said sensor for controlling the application of said force by said force actuator in response to the vibrations sensed by said sensor;
wherein said spring arrangement provides a delay equal to or greater than a delay in the application of the controlling force by said force actuator in response to the sensed vibrations.

86. An active vibration isolation mount for mounting a first member to a second member and for reducing the transmission of vibrations from said first member to said second member, the active vibration isolation mount arrangement comprising:
a first mounting point for mounting to said first member;
a second mounting point for mounting to said second member;
a spring arrangement connected between said first and second mounting points;
a sensor arrangement for sensing vibrations in said first member; and
a force actuator arrangement for applying a controlling force to said second member under the control of a controller in response to the vibrations sensed by said sensor arrangement;
wherein said spring arrangement is adapted to provide a delay in said first direction equal to or greater than a delay in the application the controlling force in response to the vibrations in said first member.

* * * * *

UNITED STATES PATENT AND TRADEMARK OFFICE
CERTIFICATE OF CORRECTION

PATENT NO. : 7,665,708 B2  Page 1 of 1
APPLICATION NO. : 11/348508
DATED : February 23, 2010
INVENTOR(S) : Stothers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Fourth Day of January, 2011

David J. Kappos
*Director of the United States Patent and Trademark Office*